May 13, 1930.   N. GOODWIN   1,758,152
PROCESS OF PRODUCING A FINELY DIVIDED CARBON
Original Filed March 10, 1924   2 Sheets-Sheet 1
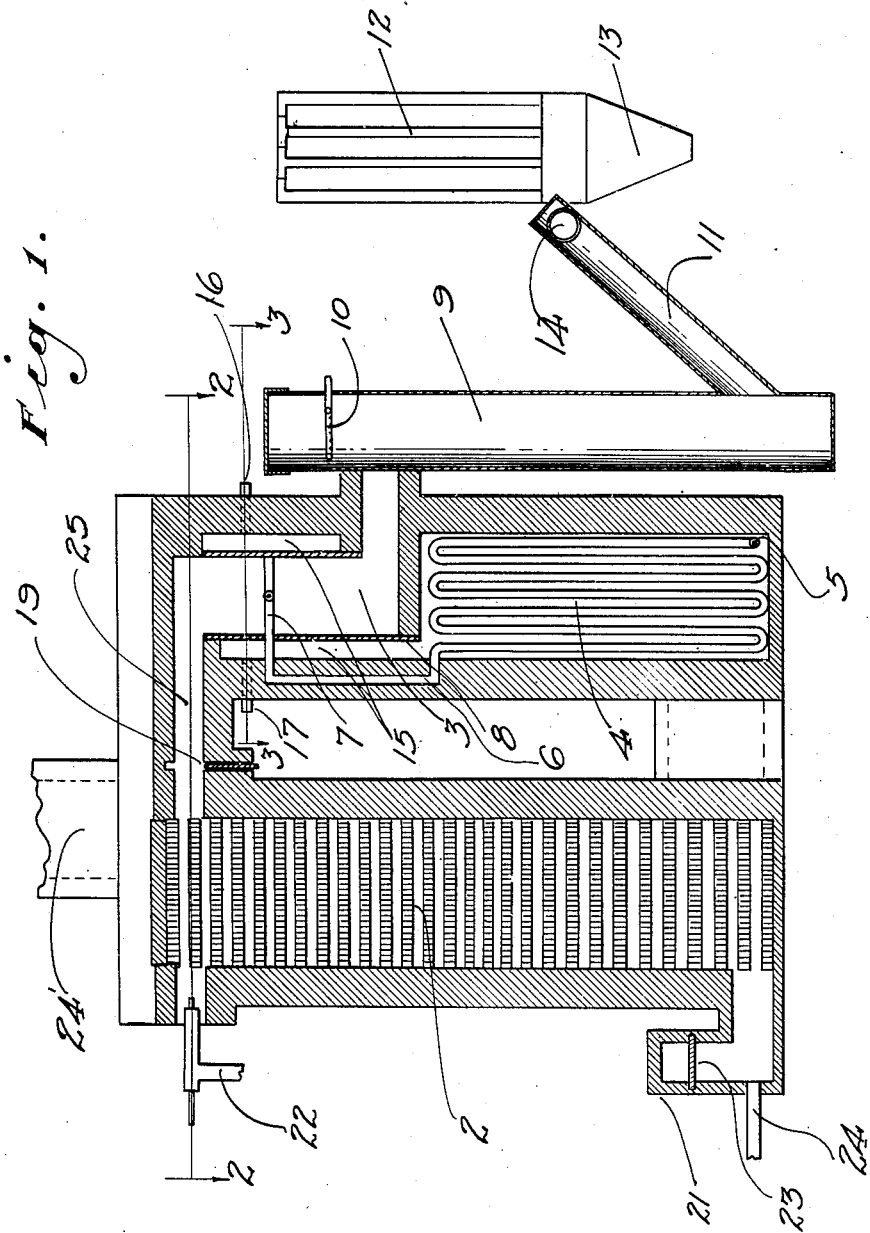
INVENTOR
NORRIS GOODWIN.
BY,
ATTORNEYS.

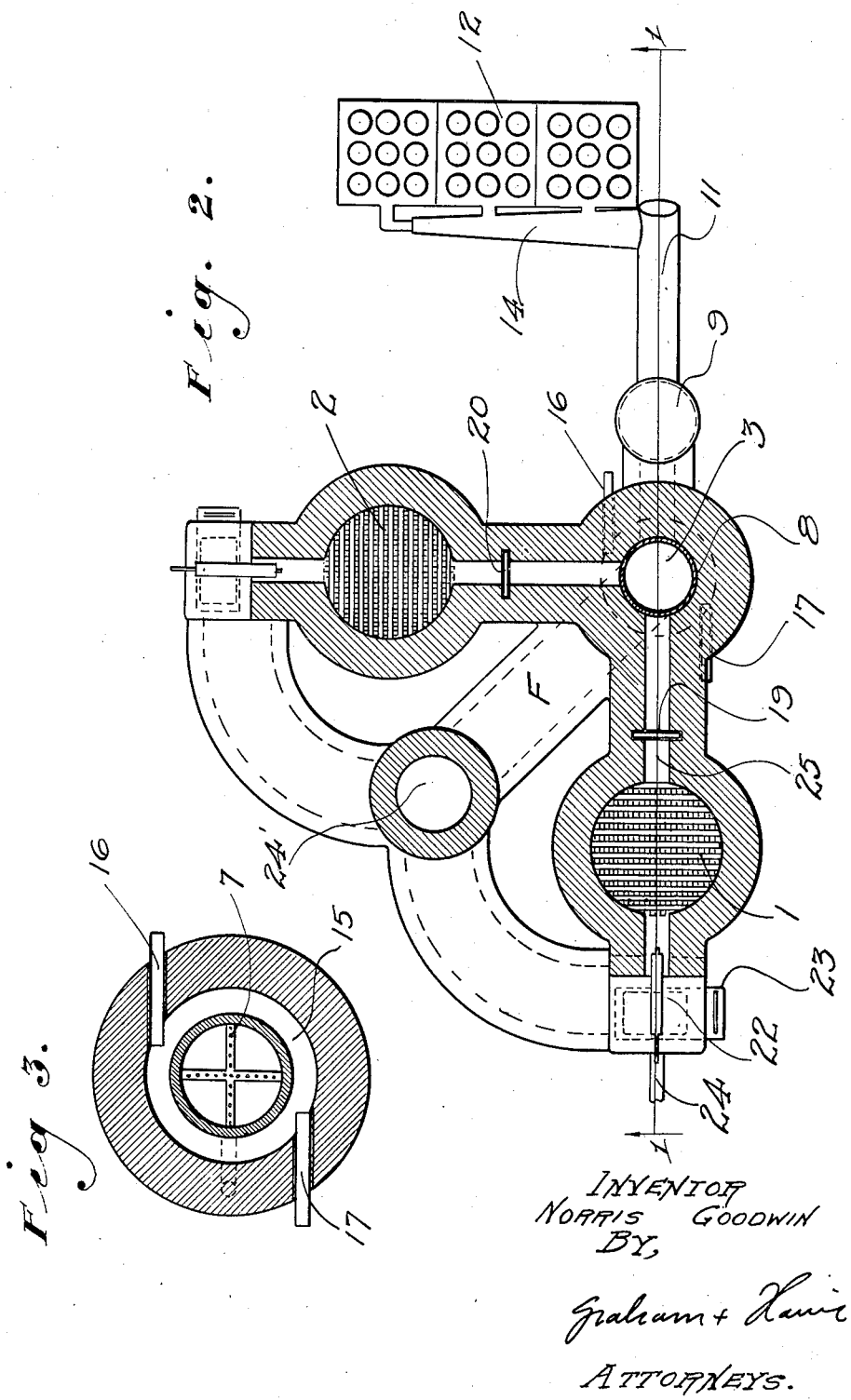

Patented May 13, 1930

1,758,152

UNITED STATES PATENT OFFICE

NORRIS GOODWIN, OF LONG BEACH, CALIFORNIA, ASSIGNOR, BY MESNE ASSIGNMENTS TO DELANO LAND COMPANY, A CORPORATION OF CALIFORNIA

PROCESS OF PRODUCING A FINELY-DIVIDED CARBON

Application filed March 10, 1924, Serial No. 698,291. Renewed October 23, 1929.

My present invention relates to a novel finely divided carbon, and to means and methods for its production.

A primary object of the process described herein, and of the apparatus employed in said process, is the economical production of a finely divided carbon, in a form especially suitable for use as a compounding ingredient in the manufacture of rubber goods, or as a black pigment suitable for use in the manufacture of paints, printing inks, etc., or wherever a very finely divided carbon of intense black color is desired.

Heretofore, a finely divided carbon, known in the arts as carbon black, has been produced by the incomplete burning of a hydrocarbon gas such as "natural gas" in a multitude of small burners; the resulting soot being collected upon relatively cool surfaces, such as iron plates, passing through the tips of the flames. The moving iron plates, besides serving as a means of collecting the produced soot or finely divided carbon, serve to cool the carbon which is set free in the flames to a temperature below that at which it is appreciably oxidized. In a measure, a cool plate against which the flames play serves to prevent the completion of an oxidizing reaction, which would otherwise tend to consume a portion of the carbon.

Those hydrocarbons which are ordinarily used for the production of carbon black decompose appreciably into carbon and hydrogen below 1000° F.; and it is doubtful if the finely divided carbon, as ordinarily produced beneath a relatively cool metallic plate and in the manner described, has heretofore been formed at or normally heated to above 1200° F. It is an object of this invention employing novel heating and controlling means and measures, to improve the quality and the quantity of carbon produced, my novel carbon product being so distinguished in its properties as to have acquired a separate status in the trade, under the name of "Goodwin carbon" or "gas dust".

The great objection to the present methods of producing finely divided carbon, as just described, is the very low yield obtained thereby, only 3% to 5% of the theoretical carbon being recovered from the natural gas or other hydrocarbon consumed; and I have discovered that if an oxygen-containing gas, such as air, and a suitable hydrocarbon gas or vapor are mixed in proportions insufficient for complete combustion, and if the zone at which they are mixed is supplied with heat from an extraneous source, as by surrounding it by a confining wall whose temperature is maintained equal to or greater than the temperature normally maintained, by the heat produced in the reaction, improved yields of finely divided carbon of very superior quality may be obtained. Furthermore, large volumes of air and gas may be mixed in one confined space, rather than in a multiplicity of small flames as has been a common practice heretofore.

I have found that, in carrying out my process, the yield and the quality of the material produced may be varied at will by varying the degree of preheating of either the air or the gas or both the air and the gas, before they are mixed for partial combustion, or by varying the temperature of the walls surrounding a zone at which, upon mixing, partial combustion takes place; and it is an object of this invention to provide means and methods for a practical utilization of the discoveries just mentioned.

Other objects of my invention will appear from the following description of an advantageous embodiment of the same, taken in connection with the appended claims and the accompanying drawings, in which:

Fig. 1 is a vertical section, substantially in the plane indicated by the line 1—1 of Fig. 2.

Fig. 2 is a horizontal section on a plane substantially as indicated by the line 2—2 of Fig. 1.

Fig. 3 is a detail view, on a slightly enlarged scale, substantially in the plane indicated by the line 3—3 of Fig. 1.

Referring to the details of that specific embodiment of my invention chosen for purposes of illustration in the accompanying drawings, 1 and 2 may be ordinary or preferred brick checker-work regenerators or hot blast stoves, whose purpose is to provide a continuous supply of heated air to the combustion chamber 3, and 4 may be, instead of an additional stove or furnace filled with checker brick, the tubes of a tube regenerator, whose purpose is to preheat hydrocarbon gas or vapor, which may enter at 5, following the passageway 6, which may lead into a distributing head such as is shown at 7, there to mix with the air in the lower part of the combustion chamber 3. The combustion gases, containing the carbon formed, whether by reaction or by thermal decomposition, or a combination of the two, may pass into a cooling device such as the vertical tower 9, shown as cooled by a water spray 10, this being in some respects preferable to a mere pipe externally cooled. The cooled gases may then pass through a pipe 11, a manifold 14, and to any suitable collecting device such as the filter bag house 12, wherein the carbon may be separated from the associated gases and collected, as in the hopper 13, from which it may be removed as desired. The water spray 10 may advantageously be so adjusted that all water admitted will be vaporized.

It is an important novel feature of my present invention that the combustion chamber 3, or its equivalent, which may advantageously be made of brick or silicon carbide unless internally heated is surrounded by comparatively thin walls 8, preferably having a fairly high thermal conductivity. I have found refractory compositions, such as compositions composed partially of silicon carbide, to be very suitable materials for the construction of this as well as such other portions of my furnace as are subjected to a high temperature. Surrounding the refractory walls 8 is shown an annular chamber 15, through whose passages 16 and 17 two burners may tangentially direct their flames, maintaining the walls 8 at a desired temperature, such as a temperature between 1200° and 3000° F. The products of combustion from the mentioned burners preferably pass downward in a spiral course into the mentioned tube regenerator, where they give up residual heat to the mentioned tubes 4, carrying the incoming gas or vapor, and pass out through a bottom passageway, such as the smoke flue F, best shown in Fig. 2.

When a plurality of regenerators 1 and 2 or their equivalent are employed, they may be intermittent in their action and together serve to furnish a continuous supply of preheated air to the top of a combustion chamber 3; and means such as the slide valves 19 and 20 may serve to cut the respective regenerators off from the passageway to the combustion chamber 3, during the periods of primary heating.

The cycle of operation of my regenerators may be best described with reference to the elevational view constituting Fig. 1. During the heating cycle in which heat is stored up in the checker-work, the slide valve 19 is closed, and the valve 23 is open. Air and fuel, which may be introduced through the burner 22, burn in the upper portion of the chamber, and the products of combustion pass downward through the checkerwork, giving up their heat to the brick composing it, and passing out past the valve 23 to the stack 24', relatively cool. When the checker bricks have attained the desired temperature, the burner 22 is shut off and the slide valve 19 is opened; the stack valve 23 is closed and air is forced in, through means such as the pipe 24. The initially cold air passes up through the brick checkerwork and is heated during its ascent; when heated to the proper temperature, it may pass through the flue or passageway 25 and enter the top of the combustion chamber 3. While regenerator 1 is supplying heated air to the combustion chamber 3, regenerator 2 is heated; and conversely, while the regenerator 2 is supplying heat to the combustion chamber, regenerator 1 is heated.

A distributing head, such as is shown at 7, may be employed as a mixing device to distribute the hydrocarbon gas or vapor uniformly throughout the introduced air. Many devices will accomplish this mixing, the one here shown being a mere cross, preferably formed from refractory tubing and having slots or holes in its under surface to direct the stream of incoming gas or vapor in such manner that it will mix thoroughly and rapidly with the air. Water admitted at 10 may be all vaporized.

Finely divided carbon, formed as above described, by a process involving an external application of heat at the time and place of reaction, and producing a temperature above that normally produced by reaction at this point, this product being now known as "Goodwin carbon", or "gas dust" is an impalpable black powder of very low apparent density, high keeping qualities, low oil absorption, comparatively non-adsorbent of gases and coloring matters, non-activatable, and especially suitable for use in the production of tacky vulcanizable rubber compositions, capable of quick curing in the presence of a minimum of an accelerator, producing exceptionally tough products. The comparatively quicker curing of vulcanizable compositions effected by my new form of carbon is thought to be due to the fact that it does not absorb the curing accelerators employed in such compositions. It has been found by experiment that when my new form of carbon is employed, from 30% to 40% less of an accelerator may be used in a vulcanizable composition, than when employing previous forms of carbon to obtain the same quality and curing time. As stated above, my present form of carbon is non-absorbent of coloring matters and it therefore does not decolorize dyes or their solutions. Analysis has shown "gas dust" or "Goodwin carbon" to contain from 0.25 to 0.5 per cent of material extractable in acetone, and this material is found to be insoluble in water. This material is probably present as an extremely thin film surrounding the individual carbon particles and accounting for the non-hygroscopic and other advantageous properties thereof. The characteristics referred to, whether or not any of them may be regarded as involving mere differences of degree, serve to distinguish my novel product very completely, in an economical and practical sense, from the carbon black heretofore known to commerce and ordinarily produced by the flame-and-plate method referred to above.

Although, I have herein described one form of installation of a complete apparatus suitable for use in the execution of my novel process, as well as said novel process and the novel product obtainable thereby, it will be obvious that various features might be independently employed and also that various modifications might be made by those skilled in the art, without the slightest departure from the spirit and scope of my invention, as the same is indicated above and in the following claims, in which the term "air" is used as equivalent to the expression: an oxygen-containing gas.

I claim as my invention:

1. A process of producing a finely divided carbon which comprises: combining air and a hydrocarbon in a reaction chamber, and supplying heat to the reacting mixture, the proportion of oxygen supplied being sufficient to set free large amounts of carbon without consuming excessive amounts thereof in the formation of carbon dioxide.

2. A process of producing a finely divided carbon which comprises: combining air and a hydrocarbon in a reaction chamber, and supplying heat to the reacting mixture during the resulting reaction in addition to the heat resulting from said reaction, the proportion of oxygen supplied being sufficient to set free large amounts of carbon without consuming excessive amounts thereof in the formation of carbon dioxide.

3. A process of producing a finely divided carbon which comprises: combining sufficient air with a hydrocarbon to produce a partial oxidation and simultaneously supplying heat from an extraneous source to the combining gases, the proportion of oxygen supplied being sufficient to set free large amounts of carbon without consuming excessive amounts thereof in the formation of carbon dioxide.

4. A process of producing a finely divided carbon which comprises: combining sufficient air with a hydrocarbon to produce a partial oxidation and simultaneously supplying heat from an extraneous source to the combining gases and in quantity sufficient to control said oxidation and to produce a thermal decomposition of excess hydrocarbon, the proportion of oxygen supplied being sufficient to set free large amounts of carbon without consuming excessive amounts thereof in the formation of carbon dioxide.

5. A process of producing a finely divided carbon which comprises: combining air with a hydrocarbon in such proportions that only an incomplete combustion can take place and maintaining the temperature during such combustion above 1200 degrees Fahrenheit by adding heat thereto in addition to the heat resulting from said combustion, the proportion of oxygen supplied being sufficient to set free large amounts of carbon without consuming excessive amounts thereof in the formation of carbon dioxide.

6. A process of producing a finely divided carbon which comprises: combining air with a hydrocarbon in such proportions that only an incomplete combustion can take place and maintaining the temperature during such combustion above 1200 degrees Fahrenheit by adding heat thereto through a wall surrounding a reaction chamber, the proportion of oxygen supplied being sufficient to set free large amounts of carbon without consuming excessive amounts thereof in the formation of carbon dioxide.

7. A process of producing a finely divided carbon which comprises: combining air with a hydrocarbon in such proportions that only an incomplete combustion can take place and maintaining the temperature during such combustion above 1200 degrees Fahrenheit by adding heat thereto by heating a portion of a reaction chamber, the proportion of oxygen supplied being sufficient to set free large amounts of carbon without consuming excessive amounts thereof in the formation of carbon dioxide.

8. A process of producing a finely divided carbon which comprises: combining air and a hydrocarbon in a reaction chamber, and supplying heat to the reacting mixture during the resulting reaction in addition to the heat produced by said reaction to control said oxidation and to produce a thermal decomposition of the intermediate products of combustion resulting from said partial oxidation.

9. A process of producing a finely divided carbon, said process comprising bringing a preheated carbon-containing gas or vapor into contact with a preheated combustion-supporting agent and effecting incomplete combustion of said gas or vapor in a region having a temperature higher than that produced alone by reaction of said agent and said gas or vapor, the proportion of oxygen supplied being sufficient to set free large amounts of carbon without consuming excessive amounts thereof in the formation of carbon monoxide or carbon dioxide.

10. A process of producing a finely divided carbon, said process comprising: bringing a preheated carbon-containing gas or vapor into contact with a preheated combustion-supporting agent in a chamber heated to a temperature not less than that produced alone by reaction of said agent and said gas or vapor, said chamber being heated from a source independent of the burning gas or vapor.

11. A process of producing a finely divided carbon, said process comprising bringing a carbon-containing gas or vapor into contact with a combustion-supporting agent in a chamber heated to a temperature not less than that produced alone by reaction of said gas or vapor, said chamber being heated from a source independent of the burning gas or vapor.

12. A process of producing a finely divided carbon which comprises bringing an oxygen containing gas into contact with a hydrocarbon in a chamber heated to a temperature above the maximum temperature to which said gas and said hydrocarbon would be heated by the combustion of their mixture, the proportion of oxygen supplied resulting in the freeing of a relatively large portion of the carbon of said hydrocarbon.

13. A process of producing a finely divided carbon which comprises bringing an oxygen containing gas into contact with a hydrocarbon in a chamber having a wall heated to a temperature above the maximum temperature to which said gas and said hydrocarbon would be heated by the combustion of their mixture, the proportion of oxygen supplied resulting in the freeing of a relatively large portion of the carbon of said hydrocarbon.

14. A process of producing a finely divided carbon which comprises bringing an oxygen-containing gas into contact with a hydrocarbon in a chamber having walls heated to a temperature above the maximum temperature to which they would be heated by the combustion of their mixture, the proportion of oxygen supplied being sufficient to set free large amounts of carbon without consuming excessive amounts thereof in the formation of carbon dioxide.

15. A process of producing a finely divided carbon which comprises combining air and a hydrocarbon in a reaction chamber, and supplying heat to the reacting mixture by means of heating the walls of said chamber above the maximum temperature to which they would be heated by the combustion of their mixture, the proportion of oxygen supplied being sufficient to set free large amounts of carbon without consuming excessive amounts thereof in the formation of carbon dioxide.

In testimony whereof, I have hereunto set my hand at Los Angeles, California, this 1st day of March, 1924.

NORRIS GOODWIN.